United States Patent
Johansson et al.

(10) Patent No.: US 11,563,829 B2
(45) Date of Patent: Jan. 24, 2023

(54) SIMPLE ETHERNET HEADER COMPRESSION

(71) Applicant: MediaTek Inc., Hsinchu (TW)

(72) Inventors: Per Johan Mikael Johansson, Singapore (SG); Mukesh Chouhan, Cambridge (GB); Pradeep Jose, Cambridge (GB); Pavan Santhana Krishna Nuggehalli, San Jose, CA (US)

(73) Assignee: MediaTek Inc.

( * ) Notice: Subject to any disclaimer, the term of this patent is extended or adjusted under 35 U.S.C. 154(b) by 0 days.

(21) Appl. No.: 16/790,731

(22) Filed: Feb. 14, 2020

(65) Prior Publication Data

US 2020/0267241 A1    Aug. 20, 2020

Related U.S. Application Data

(60) Provisional application No. 62/805,927, filed on Feb. 14, 2019.

(51) Int. Cl.
*H04L 69/04* (2022.01)
*H04W 28/06* (2009.01)
(Continued)

(52) U.S. Cl.
CPC .......... *H04L 69/04* (2013.01); *H04L 12/4645* (2013.01); *H04L 12/4666* (2013.01); *H04L 69/22* (2013.01); *H04W 28/065* (2013.01)

(58) Field of Classification Search
CPC ................ H04L 69/04; H04L 12/4645; H04L 12/4666; H04L 69/22; H04L 29/0604; H04W 28/065; H04W 28/06
See application file for complete search history.

(56) References Cited

U.S. PATENT DOCUMENTS

| | | | |
|---|---|---|---|
| 7,069,495 B2* | 6/2006 | Soderberg | H04L 69/161 714/776 |
| 7,317,724 B2* | 1/2008 | Koren | H04L 29/06 370/394 |

(Continued)

FOREIGN PATENT DOCUMENTS

| | | |
|---|---|---|
| CN | 101350812 A | 1/2009 |
| CN | 101534291 A | 9/2009 |
| CN | 107404506 A | 11/2017 |

OTHER PUBLICATIONS

China National Intellectual Property Administration, International Search Report and Written Opinion for PCT/CN2020/075338, dated May 12, 2020.

(Continued)

*Primary Examiner* — Kibrom T Hailu
(74) *Attorney, Agent, or Firm* — Han IP PLLC; Andy M. Han

(57) ABSTRACT

Various examples and schemes pertaining to simple Ethernet header compression are described. A first network node transmits a first packet with a full header to a second network node. The first network node determines whether a header compression context for the full header has been established by the second network node. In response to determining that the header compression context for the full header has been established by the second network node, the first network node transmits a second packet with a compressed header to the second network node. In response to determining that the header compression context for the full header has not been established by the second network node, the first network node transmits the second packet or a third packet with the full header to the second network node.

20 Claims, 10 Drawing Sheets

(51) Int. Cl.
  *H04L 12/46*  (2006.01)
  *H04L 69/22*  (2022.01)

(56) References Cited

U.S. PATENT DOCUMENTS

| | | | | |
|---|---|---|---|---|
| 2005/0008037 | A1* | 1/2005 | Koren | H04L 69/04 |
| | | | | 370/474 |
| 2005/0055464 | A1 | 3/2005 | Weller | |
| 2005/0238051 | A1* | 10/2005 | Yi | H04L 69/22 |
| | | | | 370/469 |
| 2006/0034249 | A1* | 2/2006 | Kallio | H04L 69/04 |
| | | | | 370/349 |
| 2007/0165604 | A1* | 7/2007 | Mooney | H04L 69/04 |
| | | | | 370/352 |
| 2009/0154460 | A1* | 6/2009 | Varela | H04L 69/04 |
| | | | | 370/392 |
| 2009/0319630 | A1* | 12/2009 | Weller | H04L 69/04 |
| | | | | 709/206 |
| 2010/0135216 | A1* | 6/2010 | Yi | H04L 69/161 |
| | | | | 370/328 |
| 2010/0172375 | A1* | 7/2010 | Rochon | H04L 69/04 |
| | | | | 370/474 |
| 2018/0063746 | A1* | 3/2018 | Anchan | H04L 65/70 |
| 2018/0359811 | A1* | 12/2018 | Verzun | H04W 88/16 |

OTHER PUBLICATIONS

Taiwan Intellectual Property Office, Office Action for Taiwan Patent Application No. 109104750, dated Feb. 26, 2021.

\* cited by examiner (A)
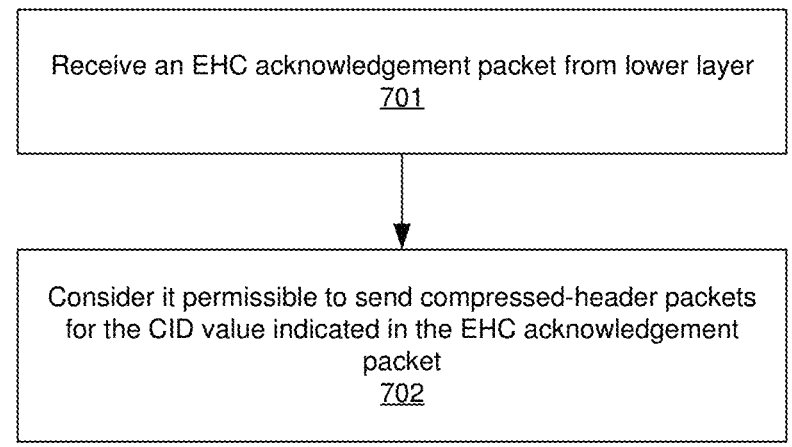
(B)
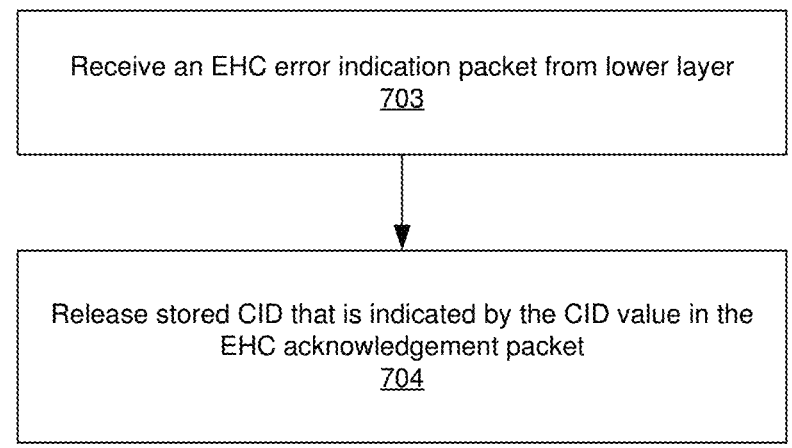
FIG. 7

SIMPLE ETHERNET HEADER COMPRESSION

CROSS REFERENCE TO RELATED PATENT APPLICATION(S)

The present disclosure is part of a non-provisional application claiming the priority benefit of U.S. Patent Application No. 62/805,927, filed on 14 Feb. 2019, the content of which being incorporated by reference in its entirety.

TECHNICAL FIELD

The present disclosure is generally related to digital communications and, more particularly, to techniques pertaining to simple Ethernet header compression methods and apparatus thereof.

BACKGROUND

Unless otherwise indicated herein, approaches described in this section are not prior art to the claims listed below and are not admitted as prior art by inclusion in this section.

Ethernet is a computer networking technology commonly used for transmitting datagrams in a local and wide area networks (LAN/WAN). The basic unit of data transmission over an Ethernet network is known as a frame that defines the protocol data unit at the Open Systems Interconnection (OSI) Layer 2 (L2) link level or a packet that defines the protocol data unit at the OSI Layer 3 (L3). Ethernet has a minimum packet size no less than 64 bytes that include two 6-byte addresses, 2 bytes of type or length, 4 bytes for cyclic redundancy check (CRC), and 46 bytes of data. The number of data bytes may be reduced by 4 bytes to 42 bytes if 4 bytes for virtual local area network (VLAN) are present. Typically, if a host has less than 46 bytes (or 42 bytes with VLAN) of data to send, the host adds padding bytes to extend the data to 46 bytes (or 42 bytes with VLAN). In wireless communications, there is a desire to transmit as few bytes as possible (e.g., by compressing packet headers) to maximize the scarce radio resources.

There are currently standardized header compression mechanisms for protocols such as protocols including Internet Protocol (IP), Transmission Control Protocol (TCP), User Datagram Protocol (UDP) and Real-time Transport Protocol (RTP) specified by Internet Engineering Task Force (IETF). For example, Robust Header Compression (ROHC) is a mechanism that compresses protocol headers of aforementioned protocols such that the overhead of packet headers for such protocols can be less when the compressed protocol(s) are carried over another communication protocol equipped with ROHC.

However, there is currently no standardized header compression mechanisms for Ethernet packets or frames (herein referred to as Ethernet packets). Ethernet packets are usually not carried by other L2 protocols. Nevertheless, to support time sensitive networking over $3^{rd}$ Generation Partnership Project (3GPP) wireless connections, it is reasonable to carry Ethernet packets over a 3GPP wireless connection. Similarly, when tunneling Ethernet over other protocols, it may be desired to compress Ethernet headers to reduce the overhead especially since overhead is particularly costly over wireless links.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to a simple Ethernet header compression mechanism to achieve reduction in overhead and improvement in overall system performance.

In one aspect, a method may involve a processor of a first network node transmitting a first packet with a full header to a second network node. The method may also involve the processor determining whether a header compression context for the full header has been established by the second network node. The method may further involve the processor transmitting a second packet with a compressed header to the second network node responsive to determining that the header compression context for the full header has been established by the second network node.

In another aspect, a method may involve a processor of a second network node receiving a first packet with a full header from a first network node. The method may also involve the processor establishing a header compression context for the full header. The method may further involve the processor transmitting a feedback associated with the full header to the first network node.

In yet another aspect, an apparatus may include a communication device and a processor coupled to the communication device. The communication device may be configured to communicate with a second network node. The processor may transmit, via the communication device, a first packet with a full header to the second network node. The processor may also determine whether a header compression context for the full header has been established by the second network node. In response to determining that the header compression context for the full header has been established by the second network node, the processor may transmit, via the communication device, a second packet with a compressed header to the second network node. In response to determining that the header compression context for the full header has not been established by the second network node, the processor may transmit, via the communication device, the second packet or a third packet with the full header to the second network node.

It is noteworthy that, although description provided herein may be in the context of certain radio access technologies, networks and network topologies such as Ethernet, the proposed concepts, schemes and any variation(s)/derivative(s) thereof may be implemented in, for and by other types of radio access technologies, networks and network topologies such as, for example and without limitation, $5^{th}$ Generation (5G), New Radio (NR), Long-Term Evolution (LTE), LTE-Advanced, LTE-Advanced Pro, narrowband (NB), narrowband Internet of Things (NB-IoT), Wi-Fi, infrared, Bluetooth and any future-developed networking and communication technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 7 is a diagram of an example scenario in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to simple Ethernet header compression methods and apparatus thereof. According to the present disclosure, a number of possible solutions may be implemented separately or jointly. That is, although these possible solutions may be described below separately, two or more of these possible solutions may be implemented in one combination or another.

Figure 1:
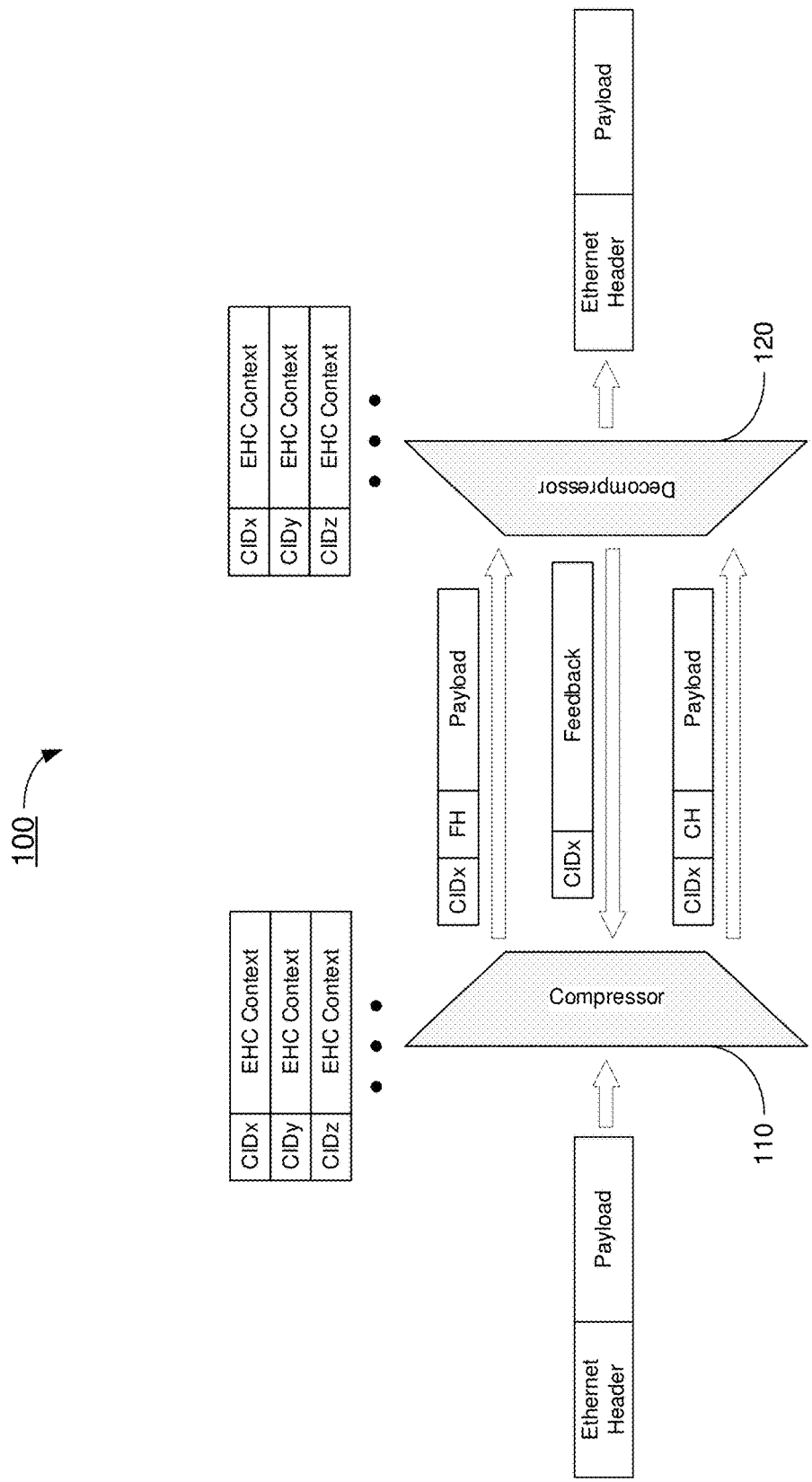
FIG. 1 is a diagram of an example design with which various solutions and schemes in accordance with the present disclosure may be implemented.
Figure 2:
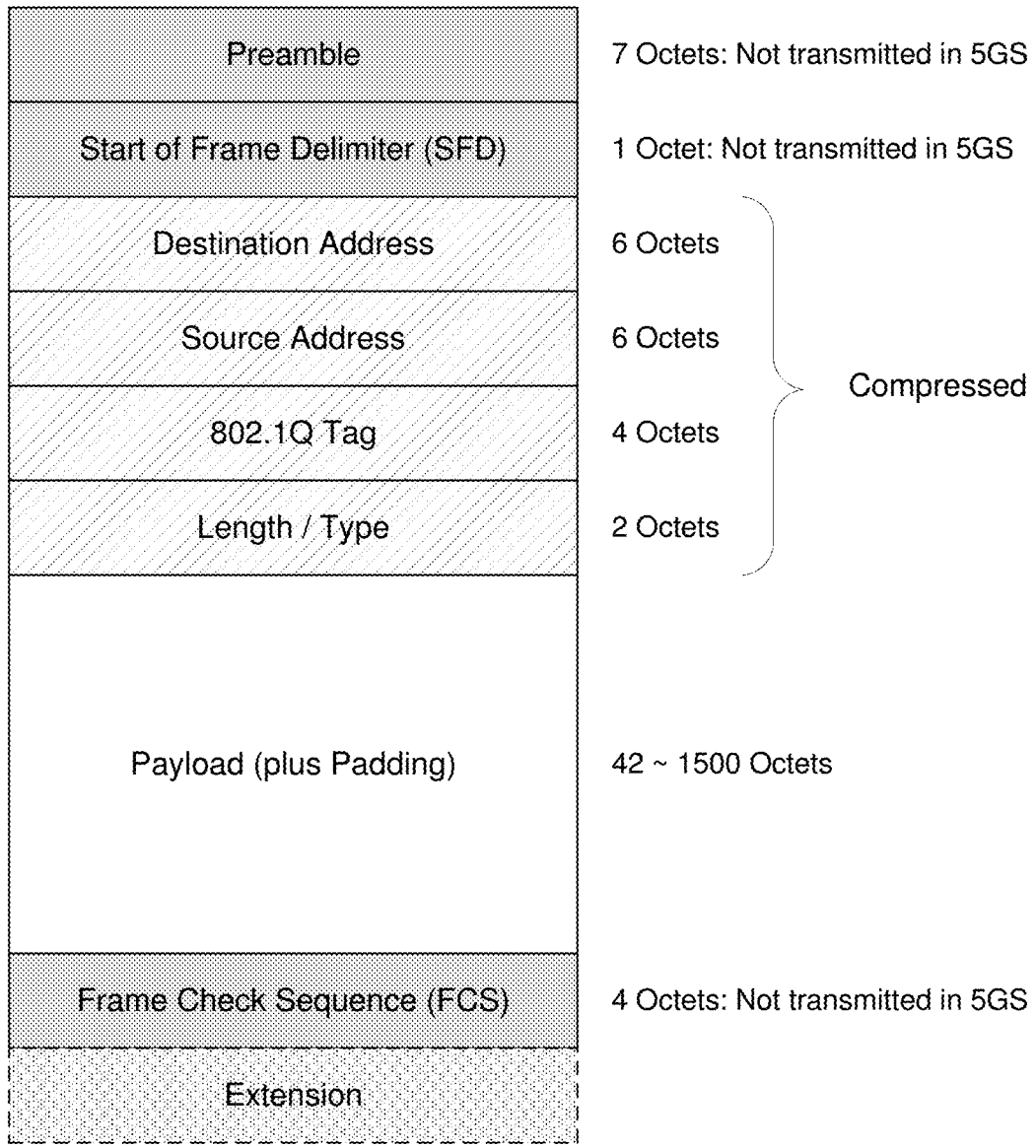
FIG. 2 is a diagram of an example Ethernet header in accordance with an implementation of the present disclosure.

FIG. 1 illustrates an example design 100 with which various solutions and schemes in accordance with the present disclosure may be implemented. FIG. 2 illustrates an example Ethernet header 200 in accordance with an implementation of the present disclosure. The following description of design 100 is provided with reference to FIG. 2.

Referring to FIG. 1, design 100 may involve a compressor 110 and a decompressor 120 in communication with one another. Compressor 110 may be a part of a transmitting entity, a first apparatus or a first network node, and decompressor 120 may be a part of a receiving entity, a second apparatus or a second network node. Under a proposed scheme in accordance with the present disclosure, an Ethernet header compression (EHC) protocol may be utilized to compress Ethernet headers such as Ethernet header 200. As shown in FIG. 2, Ethernet header 200 may include header fields such as, for example and without limitations, preamble, start of frame delimiter (SFD), destination address, source address, 802.1Q tag, length (e.g., for an Ethernet frame) or type (e.g., for an extended Ethernet frame), payload (plus optional padding), frame check sequence (FCS) and, optionally, extension. Under the proposed scheme, some but not all of the aforementioned fields may be compressed. For instance, fields such as destination address, source address, 802.1Q tag, length/type may be compressed by the proposed EHC protocol. Other fields, such as preamble, SFD and FCS, are not transmitted in a $5^{th}$ Generation System (5GS) and thus may not be considered in the EHC protocol.

Under the proposed scheme, each of compressor 110 and decompressor 120 may store original header field information as a "EHC context" (herein interchangeably referred to as "header compression context"). Each EHC context may be identified or otherwise corresponding to a unique identifier (ID), herein referred to as a context ID. In operation, compressor 110 may establish an EHC context (e.g., by storing information of the original header field) of a full-header (FH) packet and then transmit the full-header packet to decompressor 120. Upon receipt of the full-header packet, decompressor 120 may also establish an EHC context (e.g., by storing information of the original header field) of the full-header packet. The stored header field information may include those fields that are removed by compression, such as the destination address, source address, 802.1Q tag, length/type fields.

Under the proposed scheme, after compressor 110 is confident or otherwise determines that the EHC context has been established in or by decompressor 120, compressor 110 may transmit a compressed version of the full-header packet, herein referred to as a compressed-header (CH) packet, to decompressor 120. The compressed header may include only the header fields not stored in the EHC context. When decompressor 120 receives the compressed-header packet, decompressor 120 may restore the original header fields based on the stored EHC context.

It is imperative that the EHC context for a given packet is synchronized between compressor 110 and decompressor 120. Otherwise, there is a possibility that decompressor 120 may erroneously decompress header packet(s). To avoid erroneous decompression, compressor 110 may transmit full-header(s) packet one or more times until compressor 110 is confident or otherwise determines that the EHC context has been successfully established in or by decompressor 120. Under the proposed scheme, compressor 110 may be acquired or otherwise derived by an explicit EHC feedback transmitted by decompressor 120 and received by compressor 110. Specifically, decompressor 120 may transmit the EHC feedback to compressor 110 after an EHC context for the full header of the full-header packet has been established (e.g., information of the original header field, such as those fields to be removed during compression, having been stored). After the EHC feedback is received from decompressor 120, compressor 110 may transmit compressed-header packet(s) to decompressor 120.

In the example shown in FIG. 1, for each of a plurality of packets (e.g., packets x, y and z), compressor 110 may establish a respective EHC context by storing information of respective header fields to be removed as a result of compression (e.g., the destination address, source address, 802.1Q tag, length/type fields). Moreover, compressor 110 may assign or otherwise allocate a unique context ID (CID) corresponding to each EHC context. Referring to FIG. 1, CID x may correspond to the EHC context of packet header x, CID y may correspond to the EHC context of packet header y, and CID z may correspond to the EHC header of packet header z. In operation, compressor 110 may transmit an Ethernet packet (or Ethernet frame) with packet header x as a full header and its corresponding CID (namely CID x), along with a respective payload, to decompressor 120. Upon receipt of the full-header packet with packet header x and CID x, decompressor 120 may establish a respective EHC context for packet header x (by storing information of respective header fields to be removed as a result of compression) and correlate CID x to the EHC context established for packet header x. Then, decompressor 120 may transmit an EHC feedback with CID x to compressor 110 to indicate a successful establishment of EHC context for packet header x. Upon receiving the EHC feedback with CID x, compressor 110 is confident or otherwise determines that decompressor 120 has successfully established an EHC context for packet header x. Accordingly, compressor 110 may then transmit a subsequent Ethernet packet (or Ethernet frame) with packet header x in the form of a compressed-header along with CID x for identification, and a respective payload. The aforementioned process may continue for other packets such as one or more Ethernet packets (or Ethernet frames) with packet header y and one or more Ethernet packets (or Ethernet frames) with packet header z. In an event that compressor 110 receives no feedback or a feedback corresponding to a different packet from decompressor 120, compressor 110 may continue to transmit to decompressor 120 one or more Ethernet packets (or Ethernet frames) with packet header x in the form of a full header and CID x, along with payload, for one or more times until compressor 110 determines that EHC context for packet header x has successfully been established in or by decompressor 120. Thus, under various proposed schemes in accordance with the present disclosure, a first packet may be transmitted with a full header and, upon the transmitting entity determining that an EHC context for the full header of the full packet header has been successfully established, subsequent packets (with same or different payload compared to that of the first packet) may be transmitted with a compressed packet header. That is, the header format between the first packet and that of subsequent packets may be the same, but the payloads may be different.

Under a proposed scheme in accordance with the present disclosure, when utilized in data communication and/or networking, the EHC protocol may generate two types of output packets. For instance, the EHC protocol may generate EHC compressed packets each associated with one Packet Data Convergence Protocol (PDCP) service data unit (SDU). Moreover, the EHC protocol may generate stand-alone packets not associated with a PDCP SDU (e.g., interspersed EHC feedback). An EHC compressed packet may be associated with the same PDCP sequence number (SN) and count value as the related PDCP SUD. The header compression may not be applicable to the Service Data Adaptation Protocol (SDAP) header and the SDAP control protocol data unit (PDU) if included in the PDCP SDU. Under the proposed scheme, interspersed EHC feedback may not be associated with a PDCP SDU. Additionally, interspersed EHC feedback may not be associated with a PDCP SN and may not be ciphered.

Under the proposed scheme, in an event that EHC is configured by upper layers for PDCP entities associated with user plane data, the PDCP data PDUs may be decompressed by the EHC protocol after deciphering. The header decompression may not be applicable to the SDAP header and the SDAP control PDU if included in the PDCP data PDU.

Under the proposed scheme, when an interspersed EHC feedback is generated by the EHC protocol (e.g., by decompressor 120), the transmitting PDCP entity may submit to lower layers the corresponding PDCP control PDU without associating a PDCP SN and without performing ciphering. At reception of a PDCP control PDU for interspersed EHC feedback from lower layers, the receiving PDCP entity may deliver the corresponding interspersed EHC feedback to the EHC protocol (e.g., compressor 110) without performing deciphering.

Figure 3:
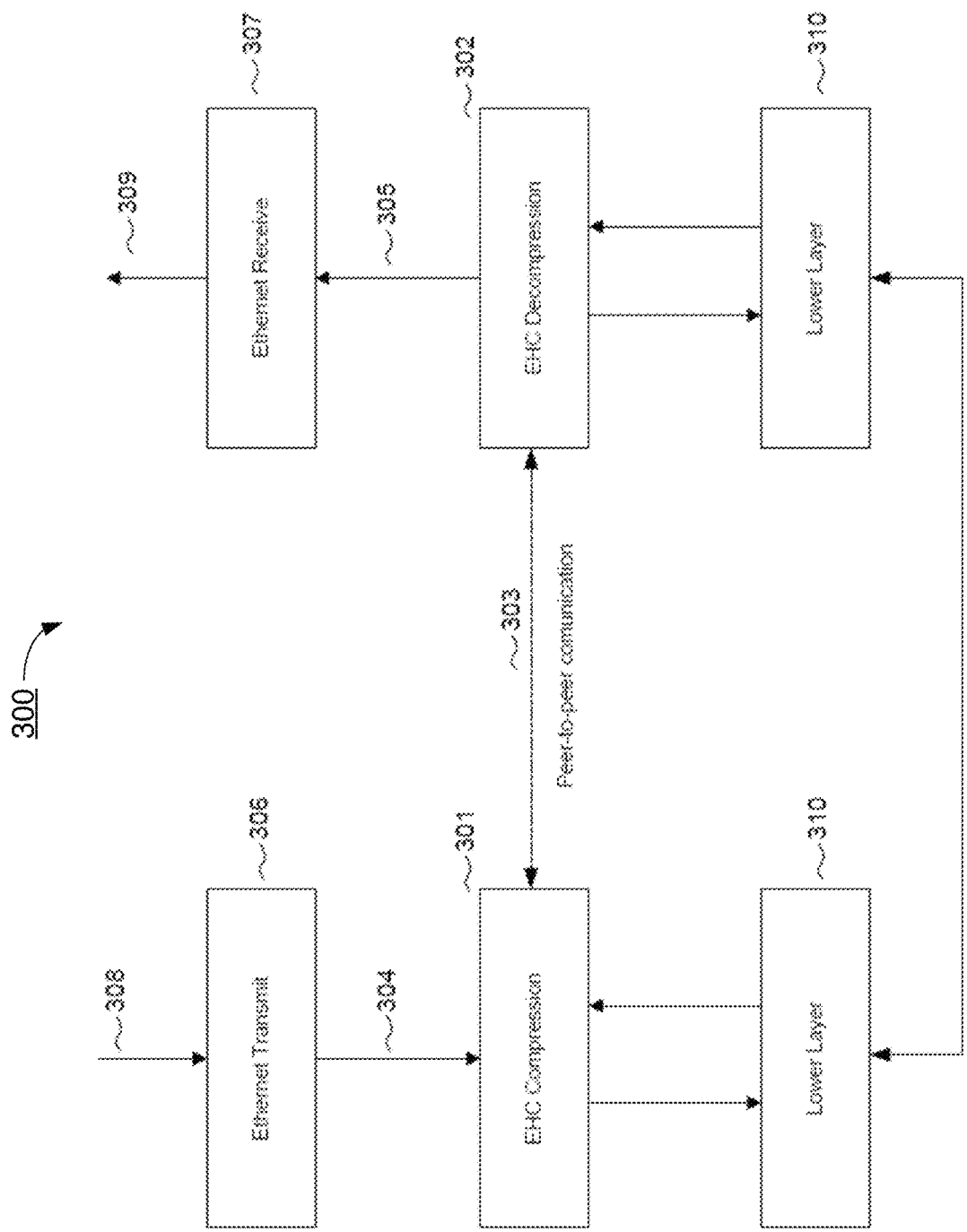
FIG. 3 is a diagram of a simplified protocol stack in accordance with an implementation of the present disclosure.

FIG. 3 illustrates a simplified protocol stack 300 in accordance with an implementation of the present disclosure. The simplified protocol stack 300 shows the relation between Ethernet transmit layer 306, Ethernet receive layer 307, EHC compression entity 301, EHC decompression entity 302, and lower layer 310. Ethernet transmit layer 306 may receive packets 308 on one end and Ethernet receive layer 307 may provide packets 309 on the other end. As shown in FIG. 3, EHC compression entity 301 receives Ethernet packets 304 from a higher layer (e.g., Ethernet transmit layer 306) performs EHC processing, and uses lower entity 310 for its peer-to-peer communication 303 to transmit the EHC processed packet. The peer EHC decompression entity 302 receives the processed packet, performs EHC decompression processing to restore the original, full Ethernet header, and provide a packet with a regular Ethernet header 305 to a higher layer (e.g., Ethernet receive layer 307). In some implementations, it may be assumed that a specification specifying EHC would contain a description of the communication between the EHC peers 303, a description of EHC compression entity 301, and a description of EHC decompression entity 302, and possibly a description of the header field information to be stored.

In FIG. 3, EHC compression entity 301 and EHC decompression entity 302 are illustrated as separate entities for clarity. A realistic implementation may, however, be designed for bidirectional EHC, meaning that both EHC peer ends may support both transmit/compression 301 and receive/decompression 302. Also, in FIG. 3, the Ethernet layers 306 and 307 are illustrated as being higher layer in a protocol stack. However, this is just an example. Other embodiments may include scenarios in which Ethernet transmit layer 306 and Ethernet receive layer 307 may be implemented in network entities different from the one(s) where EHC is implemented, and/or there may be additional protocol layers involved in the communication.

Figure 4:
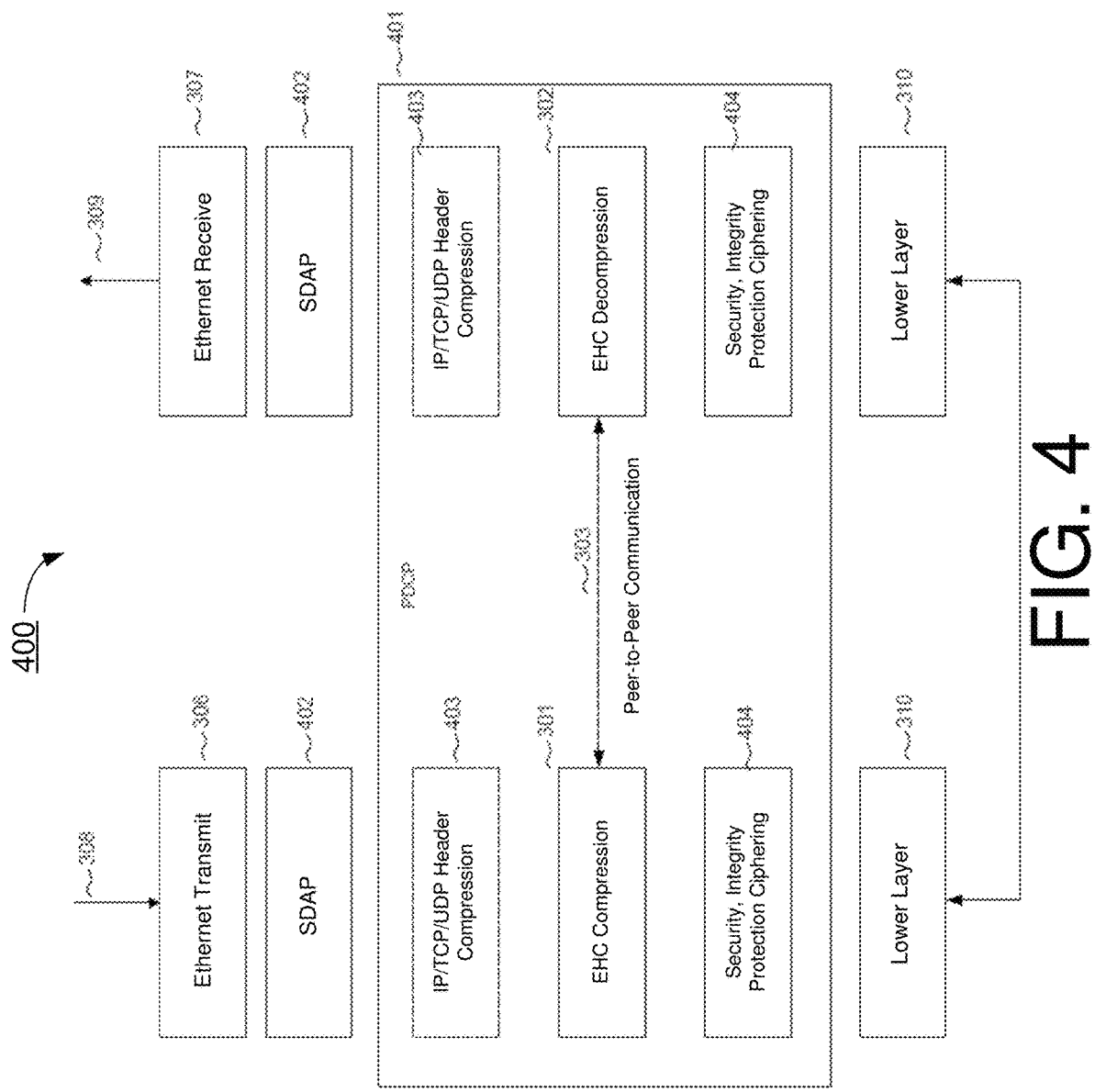
FIG. 4 is a diagram of a simplified protocol stack in accordance with an implementation of the present disclosure.

FIG. 4 illustrates a simplified protocol stack 400 in accordance with an implementation of the present disclosure. FIG. 4 shows the relation between protocol layers in an embodiment that contains 3GPP layers SDAP 402 and PDCP 401 and where EHC compression 301 and EHC decompression 302 is implemented as a subfunction of the PDCP layer 401. FIG. 4 further show a preferred decomposition of the PDCP layer where header compression of IP/TCP/UDP/RTP packets may operate independently from EHC and, thus, may be applied or not applied independent of EHC. Another embodiment may include the case when these are merged into a common sublayer, and may use common header compression fields (e.g., a common context ID). In FIG. 4, PDCP security 404 is a protocol sub-layer that is "lower" relative to EHC.

Figure 5:
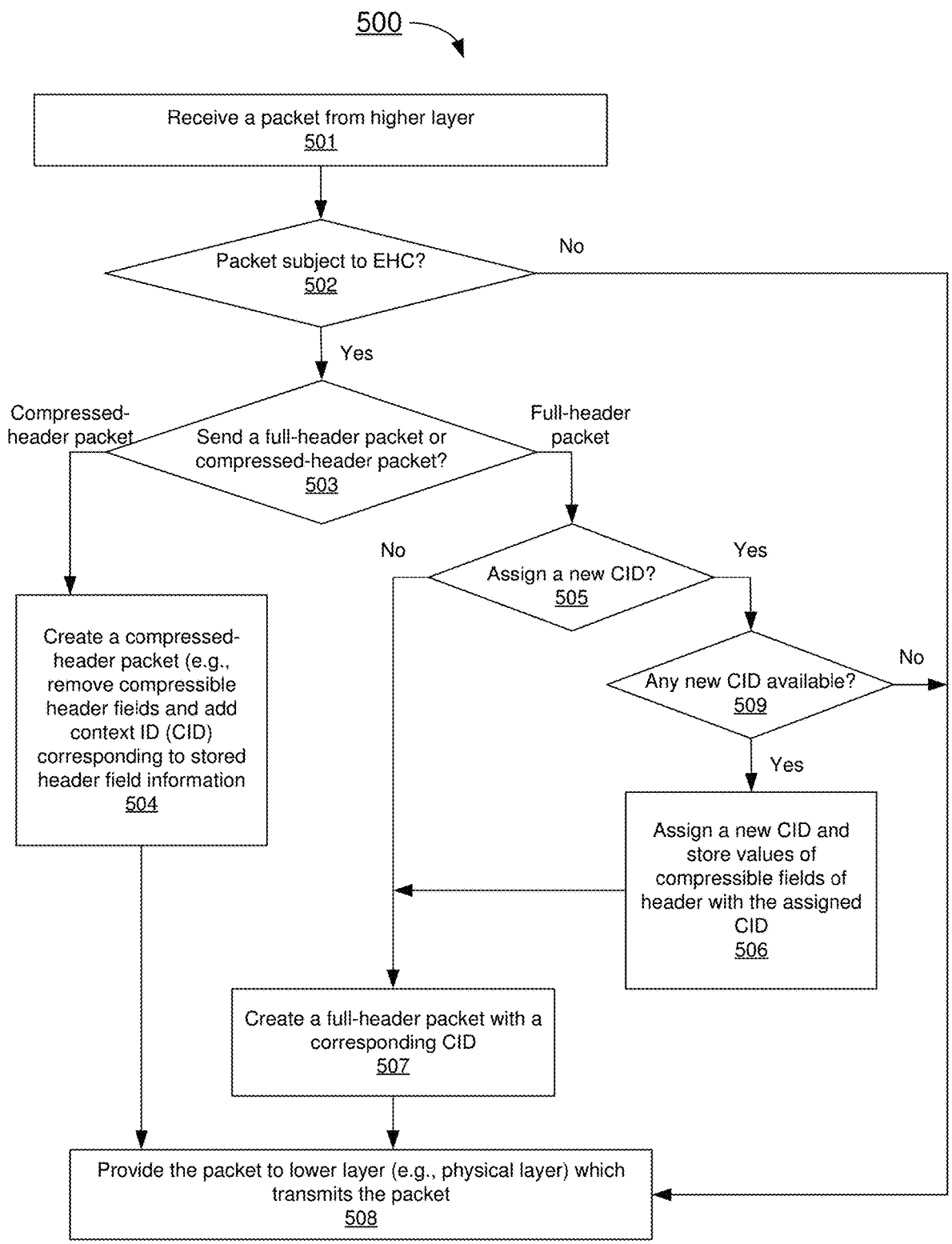
FIG. 5 is a diagram of an example mechanism in accordance with an implementation of the present disclosure.

FIG. 5 illustrates an example mechanism 500 in accordance with an implementation of the present disclosure. Scenario 500 shows basic steps of the proposed EHC procedure in the transmit direction (e.g., compression).

At 501, a packet containing a regular Ethernet header may be received from a higher protocol layer or another network entity.

At 502, it is determined whether or not all packets can be subject to EHC (and hence whether EHC is to be performed). A possible reason to not perform EHC could be, for example, that the particular version of Ethernet cannot be compressed by a particular version of EHC (e.g., because fields cannot be recognized). Another possible reason to not perform EHC could be that, in order to compress the packet, a new CID need to be allocated and all available CIDs have been consumed/used (as determined at 505 and 509). When it is determined that EHC is not to be performed, the EHC procedure proceeds from 502 to 508 and provides the packet to lower layer for transmission. For clarity, in FIG. 5, the decision steps 502, 503, 505 and 509 are described as separate and consecutive steps but could of course be merged and/or performed in other sequence.

At 503, it is determined whether a full-header packet or a compressed-header packet is to be transmitted. A full-header packet may be referred to as a start packet, an initialization packet or a refresh packet. The transmitter/compressor may match the header fields of the Ethernet packet received from higher layer. If there is a match (e.g., for a valid CID the stored compressible fields would match the fields in the Ethernet Packet), then a compressed-header packet can be sent. Otherwise, a full-header packet would need to be sent. Also, in case there is a CID expiry/validity timer that has expired, then a full-header packet may need to be sent so as to ensure that the EHC context on the receiving end is refreshed. In case a full-header packet is to be sent, at 505 it is determined whether to assign or otherwise allocate a new CID. In case the Ethernet header fields do not match the stored set of fields for a stored or valid CID, then a new CID would need to be assigned or otherwise allocated. In case there is a header-fields match for a stored CID, the stored CID may be used. For the non-match case, at 506 a new CID may be assigned or otherwise allocated if available. With the new CID the values of the compressible Ethernet header fields are stored together with the CID. At 507 a full header packet may be created, for example, by using the contents of the original packet and adding at least the associated CID in a EHC header field.

In case, at 503, it is determined that a compressed-header packet is to be sent, such a packet is created at 504 by removing the compressible header fields from the Ethernet header and adding an EHC header that includes at least the CID which corresponds to the set of stored Ethernet header fields matching the Ethernet packet. A non-EHC packet could be recognized by the peer, for example, by a bit/indication in a EHC header meaning that the packet is not subject to EHC compression. Alternatively, the absence of an EHC header, or an indication in a lower or higher protocol layer or sub-layer, may be utilized to indicate such. A compressed-header packet or a full-header packet could be indicated by a EHC header field.

In a particular embodiment, all fields in the Ethernet header may be compressible and may be removed in a compressed header packet. In another embodiment, also for full-header packets and possibly for non-EHC-packets, some fields may be removed (e.g., CRC checksums (in case the underlying technology has other error handling) and possibly also padding).

Figure 6:
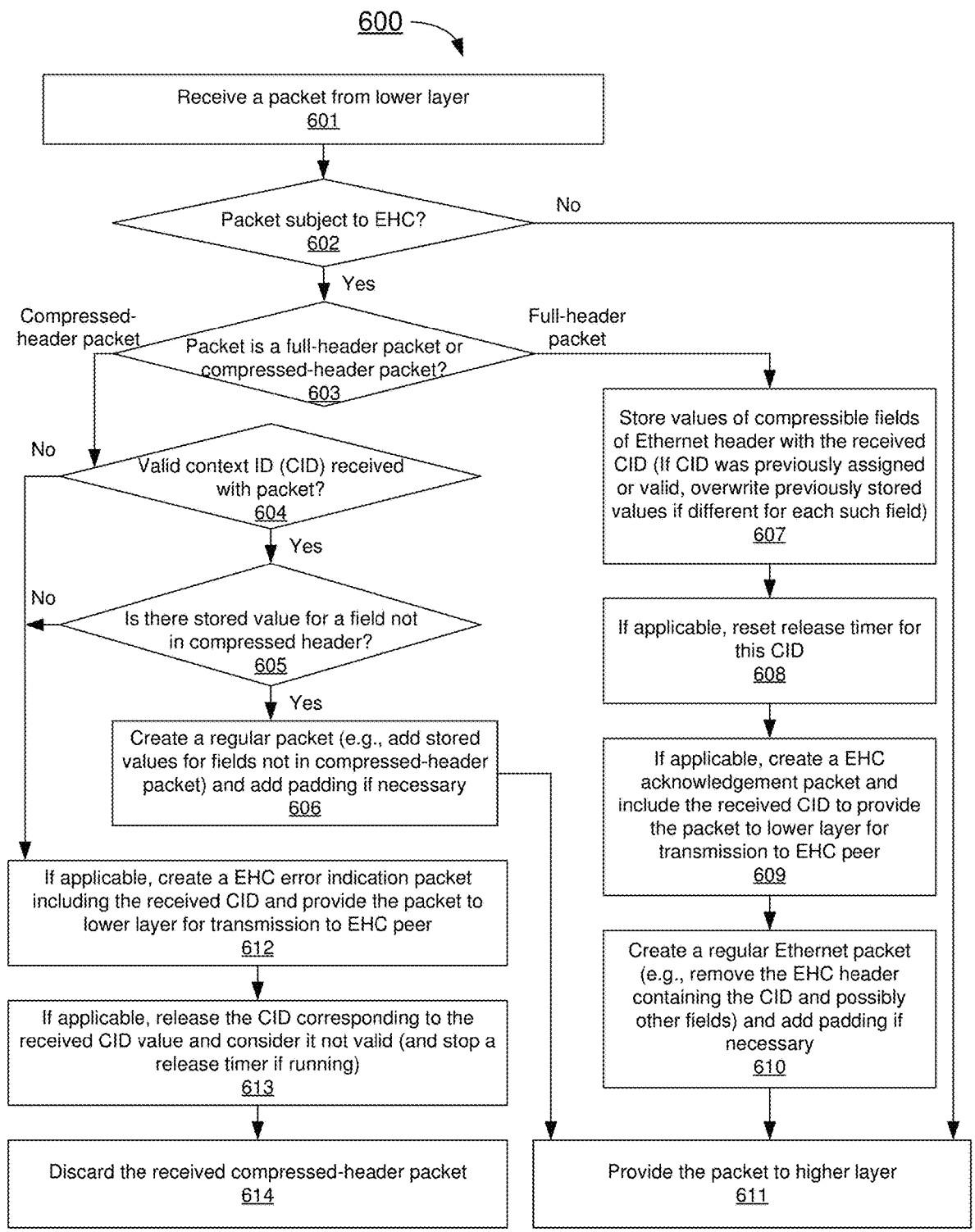
FIG. 6 is a diagram of an example mechanism in accordance with an implementation of the present disclosure.

FIG. 6 illustrates an example mechanism 600 in accordance with an implementation of the present disclosure. Scenario 600 shows basic steps and optional steps of the proposed EHC procedure in the receive direction (e.g., decompression). At 601, a packet may be received from a peer entity via lower layers. At 602, it is determined whether the packet is subject to EHC. At 603, it is determined whether the packet is a full-header EHC packet or a compressed-header EHC packet. The determination may preferably be based on a type field in the EHC header. If a full-header packet is received then, at 607, the set of values of the compressible fields may be stored together with the received CID. If a non-EHC-packet is received, there is no associated CID and nothing needs to be stored. If there is a CID timer that releases or invalidates the CID and/or the related stored information at expiry, at 608 such timer may be reset when a full header packet is received. In a particular embodiment, there may be an acknowledgement mechanism for full-header packets to ensure correct initialization in case packets may be lost, when receiving a full-header packet (with a CID), at 609 an EHC ack packet containing at least the CID may be constructed and sent back to the transmitter/compressor. For full header packets, to reconstruct a regular Ethernet packet, at 611 the EHC header (e.g., with the CID) may be removed and, for example, padding and CRCs may be added if needed to be provided to higher layer.

In an event that a compressed-header packet is received, and in case at 604 it is determined that the CID and the associated stored information is valid, and in case at 605 it is determined that all omitted fields are represented by stored values, a regular Ethernet packet may be constructed by adding the stored Ethernet header field values (and, if needed, also by adding padding and CRC). In a particular embodiment, in case a compressed-header packet is received, and in case at 604 it is determined that the CID and the associated stored information is not valid, or in case at 605 it is determined that there is at least one omitted field which is not represented by a stored value, then at 612 an EHC error indication packet carrying the used CID may be constructed and sent to the EHC peer, the transmitter/compressor. Moreover, at 613, a CID corresponding to the received CID value may be considered invalid and hence released. At 614, the compressed header packet itself may be discarded.

In some implementations, a timer (herein referred to as a "release timer for CID") for the release of old not-frequently used information may be utilized. Such timer may be used, for example, to prevent that CIDs are used up by old non-active sessions. When, at 620, such timer for a CID expires the corresponding CID may be released, removed from memory, or marked as invalid, and possibly also together with all information stored together with the CID.

FIG. 7 illustrates an example scenario 700 in accordance with an implementation of the present disclosure. Scenario 700 shows optional steps of the proposed EHC procedure in the transmit direction (e.g., compression) of handling feedback information received from the receiver/decompressor. That is, scenario 700 may be an example implementation by compressor 110. Referring to part (A) of FIG. 7, in one embodiment, at 701 a transmitting entity or first network node may receive an EHC acknowledgement carrying a particular CID. Resultantly, at 702 the transmitting entity or first network node may be allowed to send compressed header packets for such CID, following a full header packet with the CID. Referring to part (B) of FIG. 7, in one embodiment, at 703 the transmitting entity or first network node receives in error indication carrying a given CID. Accordingly, at 704 the transmitting entity or first network node may release stored information related to such CID or, alternatively, mark the CID as non-valid and/or store an indication that, for the CID, a full-header packet need to be sent next time.

Illustrative Implementations

Figure 8:
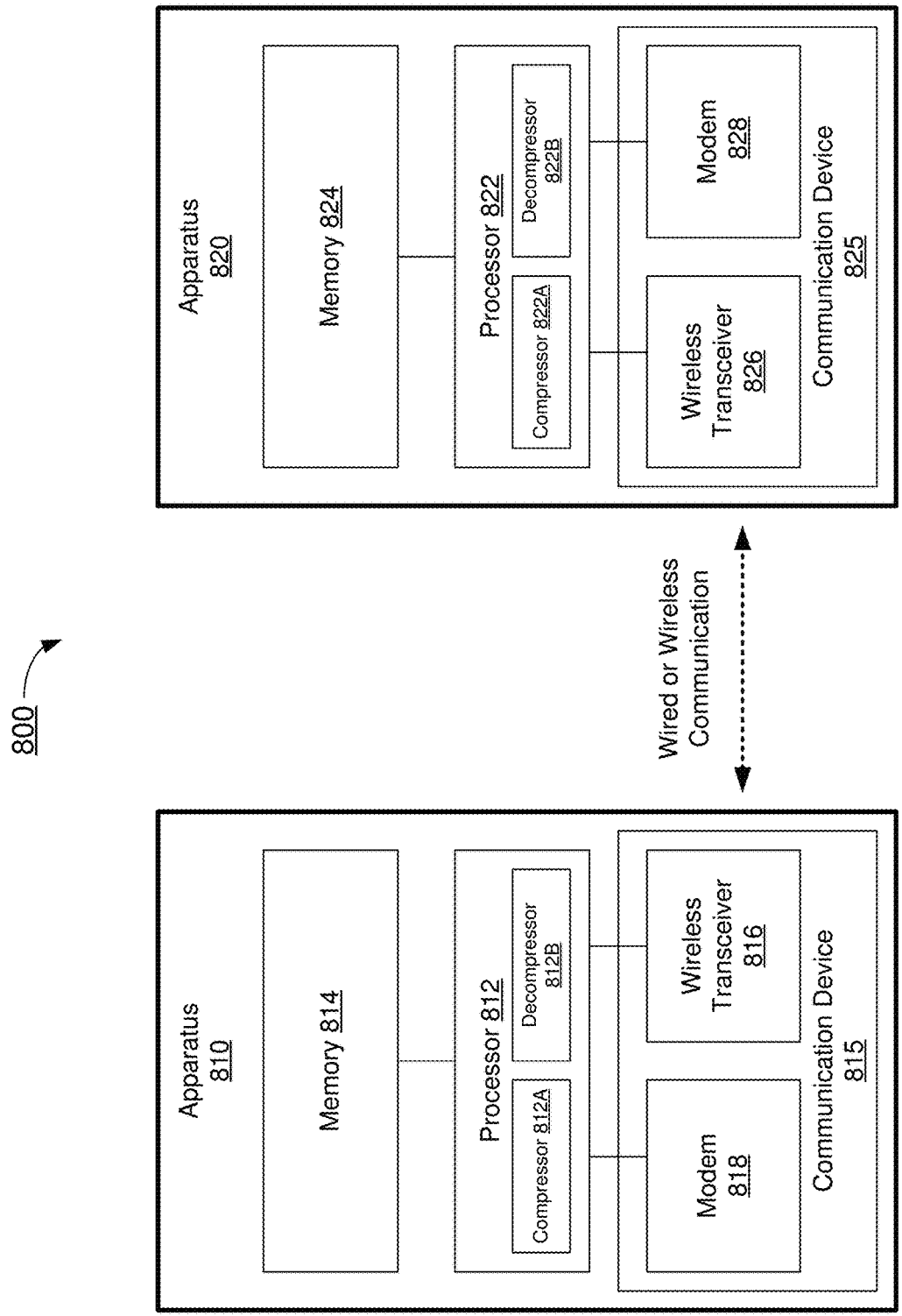
FIG. 8 is a block diagram of an example communication system in accordance with an implementation of the present disclosure.

FIG. 8 illustrates an example communication system 800 having an example apparatus 810 and an example apparatus 820 in accordance with an implementation of the present disclosure. Each of apparatus 810 and apparatus 820 may perform various functions to implement schemes, techniques, processes and methods described herein pertaining to simple Ethernet header compression, including various schemes described above as well as processes described below.

Each of apparatus 810 and apparatus 820 may be a part of an electronic apparatus, which may be a UE such as a vehicle, a portable or mobile apparatus, a wearable apparatus, a wireless communication apparatus or a computing apparatus. For instance, each of apparatus 810 and apparatus 820 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 810 and apparatus 820 may also be a part of a machine type apparatus, which may be an IoT or NB-IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. Alternatively, each of apparatus 810 and apparatus 820 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 810 and apparatus 820 may include at least some of those components shown in FIG. 8 such as a processor 812 and a processor 822, respectively. Each of apparatus 810 and apparatus 820 may further include one or more other components not pertinent to the proposed scheme of the present disclosure (e.g., internal power supply, display device and/or user interface device), and, thus, such component(s) of each of apparatus 810 and apparatus 820 are neither shown in FIG. 8 nor described below in the interest of simplicity and brevity.

In some implementations, at least one of apparatus 810 and apparatus 820 may be a part of an electronic apparatus, which may be a vehicle, a roadside unit (RSU), network node or base station (e.g., eNB, gNB or TRP), a small cell, a router or a gateway. For instance, at least one of apparatus 810 and apparatus 820 may be implemented in a vehicle in a vehicle-to-vehicle (V2V) or vehicle-to-everything (V2X) network, an eNodeB in an LTE, LTE-Advanced or LTE-Advanced Pro network or in a gNB in a 8G, NR, IoT or NB-IoT network. Alternatively, at least one of apparatus 810 and apparatus 820 may be implemented in the form of one or more IC chips such as, for example and without limitation, one or more single-core processors, one or more multi-core processors, or one or more CISC or RISC processors.

In one aspect, each of processor 812 and processor 822 may be implemented in the form of one or more single-core processors, one or more multi-core processors, or one or more CISC or RISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including simple Ethernet header compression in accordance with various implementations of the present disclosure.

In some implementations, processor 812 may include hardware components (e.g., electronic circuitry) such as a compressor 812A and a decompressor 812B. Each of compressor 812A and decompressor 812B may perform operations pertaining to simple Ethernet header compression in accordance with the present disclosure. In some implementations, either or both of compressor 812A and decompressor 812B may be implemented in software and/or firmware and executed by hardware components of processor 812. Similarly, processor 822 may include hardware components (e.g., electronic circuitry) such as a compressor 822A and a decompressor 822B. Each of compressor 822A and decompressor 822B may perform operations pertaining to simple Ethernet header compression in accordance with the present disclosure. In some implementations, either or both of compressor 822A and decompressor 822B may be implemented in software and/or firmware and executed by hardware components of processor 822.

In some implementations, apparatus 810 may also include a communication device 815 which may include a wireless transceiver 816 coupled to processor 812 and capable of wirelessly transmitting and receiving data over a wireless link (e.g., a 3GPP connection or a non-3GPP connection). In some implementations, communication device 815 may further include a modem 818 coupled to processor 812 and capable of transmitting and receiving data over a wired link (e.g., a LAN). In some implementations, apparatus 810 may further include a memory 814 coupled to processor 812 and capable of being accessed by processor 812 and storing data therein. In some implementations, apparatus 820 may also include a communication device 825 which may include a wireless transceiver 826 coupled to processor 822 and capable of wirelessly transmitting and receiving data over a wireless link (e.g., a 3GPP connection or a non-3GPP connection). In some implementations, communication device 825 may further include a modem 828 coupled to processor 822 and capable of transmitting and receiving data over a wired link (e.g., a LAN). In some implementations, apparatus 820 may further include a memory 824 coupled to processor 822 and capable of being accessed by processor 822 and storing data therein. Accordingly, apparatus 810 and apparatus 820 may wirelessly communicate with each other via transceiver 816 and transceiver 826, respectively.

To aid better understanding, the following description of the operations, functionalities and capabilities of each of apparatus 810 and apparatus 820 is provided in the context of a 5G/NR communication environment in which apparatus 810 is implemented in or as a wireless communication apparatus, a wired communication apparatus, a UE, a base station, an access point or an IoT device (e.g., a first network node) and apparatus 820 is implemented in or as a wireless communication apparatus, a wired communication apparatus, a UE, a base station, an access point or an IoT device (e.g., a second network node).

In one aspect of simple Ethernet header compression in accordance with the present disclosure, compressor 812A of processor 812 of apparatus 810 may transmit, via communication device 815, a first packet with a full header to apparatus 820. Additionally, compressor 812A (or a logic circuit of processor 812) may determine whether a header compression context for the full header has been established by apparatus 820. In response to determining that the header compression context for the full header has been established by apparatus 820, compressor 812A may transmit, via communication device 815, a second packet with a compressed header to apparatus 820. In response to determining that the header compression context for the full header has not been established by apparatus 820, compressor 812A may transmit, via communication device 815, the second packet (and one or more subsequent packet, if necessary) with the full header to apparatus 820.

In some implementations, in transmitting the first packet with the full header to apparatus 820, compressor 812A may perform certain operations. For instance, compressor 812A may establish the header compression context for the full header by storing one or more header fields of the full header of the first packet. Additionally, compressor 812A may assign or otherwise allocate a first context identifier (ID) to the header information of the full header of the first packet. Moreover, compressor 812A may transmit the first packet containing the first context ID and the full header to apparatus 820.

In some implementations, in determining that the header compression context for the full header has been established by apparatus 820, compressor 812A may receive, from apparatus 820, a feedback with the first context ID.

In some implementations, in transmitting the second packet with the compressed header to apparatus 820, compressor 812A may remove the one or more header fields from the full header to generate the compressed header.

In some implementations, in removing the one or more header fields from the full header to generate the compressed header, compressor 812A may remove a plurality of header fields comprising a destination address field, a source address field, a 802.1Q tag field, and a length or type field.

In some implementations, in determining that the header compression context for the first packet has not been established by apparatus 820, compressor 812A may receive, from apparatus 820, no feedback or a feedback associated with another packet.

In one aspect of simple Ethernet header compression in accordance with the present disclosure, compressor 822A of processor 822 of apparatus 820 may receive, via communication device 825, a first packet with a full header from apparatus 810. Additionally, compressor 822A may establish a header compression context for the first packet. Moreover, compressor 822A may transmit, via communication device 825, a feedback associated with the first packet to apparatus 810. Furthermore, compressor 822A may receive, via communication device 825, the first packet with a compressed header from apparatus 810 responsive to the transmitting of the feedback.

In some implementations, in receiving the first packet with the full header, compressor 822A may receive a first context ID and the first packet with the full header.

In some implementations, in transmitting the feedback, compressor 822A may transmit the feedback with the first context ID.

In some implementations, in establishing the header compression context for the first packet, compressor 822A may store one or more header fields of the full header of the first packet.

In some implementations, in storing the one or more header fields of the full header of the first packet, compressor 822A may store a plurality of header fields comprising a destination address field, a source address field, a 802.1Q tag field, and a length or type field.

Illustrative Processes

Figure 9:
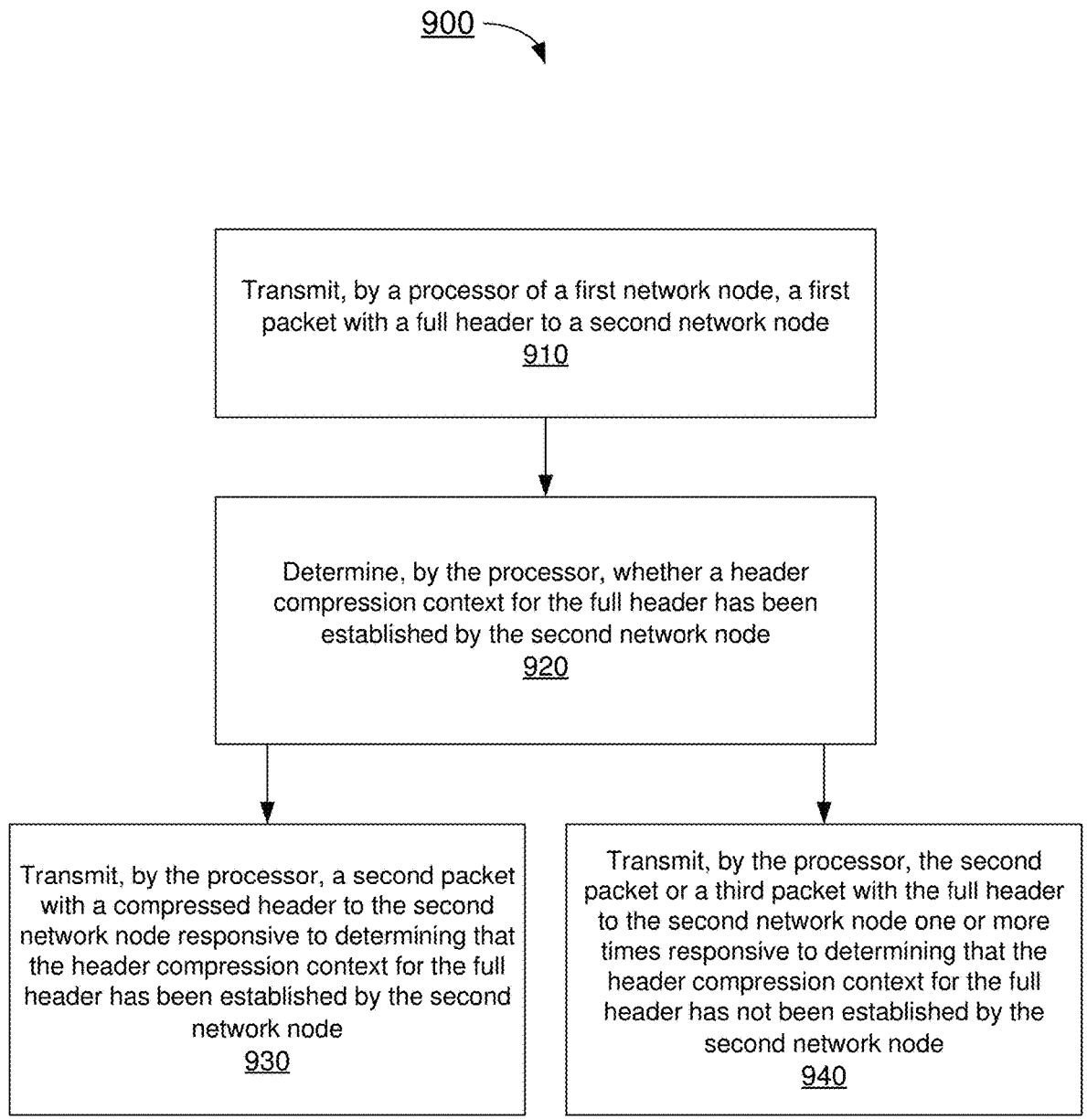
FIG. 9 is a flowchart of an example process in accordance with an implementation of the present disclosure.

FIG. 9 illustrates an example process 900 in accordance with an implementation of the present disclosure. Process 900 may be an example implementation of the proposed schemes described above with respect to simple Ethernet header compression in accordance with the present disclosure. Process 900 may represent an aspect of implementation of features of apparatus 810 and apparatus 820. Process 900 may include one or more operations, actions, or functions as illustrated by one or more of blocks 910, 920, 930 and 940. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may also be repeated partially or entirely. Process 900 may be implemented by apparatus 810, apparatus 820 and/or any suitable wireless communication device, UE, RSU, base station or machine type devices. Solely for illustrative purposes and without limitation, process 900 is described below in the context of apparatus 810 as a first network node and apparatus 820 as a second network node. Process 900 may begin at block 910.

At 910, process 900 may involve processor 812 of apparatus 810 transmitting, via communication device 815, a first packet with a full header to apparatus 820. Process 900 may proceed from 910 to 920.

At 920, process 900 may involve processor 812 determining whether a header compression context for the full header has been established by apparatus 820. Process 900 may proceed from 920 to 930 or 940.

At 930, process 900 may involve processor 812 transmitting, via communication device 815, a second packet with a compressed header to apparatus 820 responsive to determining that the header compression context for the full header has been established by apparatus 820.

At 940, process 900 may involve processor 812 transmitting, via communication device 815, the second packet or a third packet with the full header to apparatus 820 responsive to determining that the header compression context for the first packet has not been established by apparatus 820.

In some implementations, in transmitting the first packet with the full header to apparatus 820, process 900 may involve processor 812 performing certain operations. For instance, process 900 may involve processor 812 establishing the header compression context for the full header by storing one or more header fields of the full header of the first packet. Additionally, process 900 may involve processor 812 assigning a first context identifier (ID) to the header information of the full header of the first packet. Moreover, process 900 may involve processor 812 transmitting the first packet containing the first context ID and the full header to apparatus 820.

In some implementations, in determining that the header compression context for the full header has been established by apparatus 820, process 900 may involve processor 812 receiving, from apparatus 820, a feedback with the first context ID.

In some implementations, in transmitting the second packet with the compressed header to apparatus 820, process 900 may involve processor 812 removing the one or more header fields from the full header to generate the compressed header.

In some implementations, in removing the one or more header fields from the full header to generate the compressed header, process 900 may involve processor 812 removing a plurality of header fields comprising a destination address field, a source address field, a 802.1Q tag field, and a length or type field.

In some implementations, in determining that the header compression context for the full header has not been established by apparatus 820, process 900 may involve processor 812 receiving, from apparatus 820, no feedback or a feedback associated with a different full header.

Figure 10:
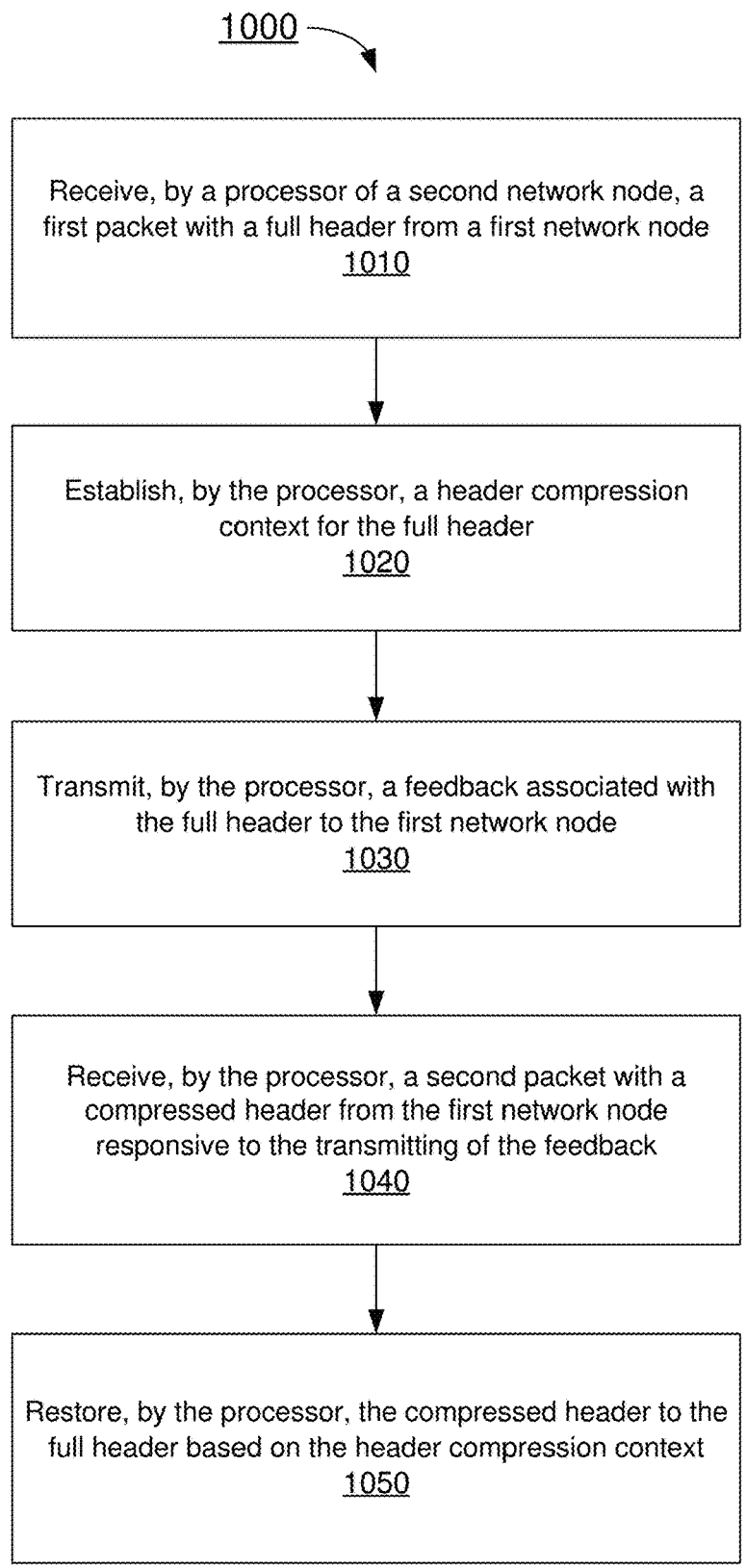
FIG. 10 is a flowchart of an example process in accordance with an implementation of the present disclosure.

FIG. 10 illustrates an example process 1000 in accordance with an implementation of the present disclosure. Process 1000 may be an example implementation of the proposed schemes described above with respect to simple Ethernet header compression in accordance with the present disclosure. Process 1000 may represent an aspect of implementation of features of apparatus 810 and apparatus 820. Process 1000 may include one or more operations, actions, or functions as illustrated by one or more of blocks 1010, 1020, 1030 and 1040. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Process 1000 may also be repeated partially or entirely. Process 1000 may be implemented by apparatus 810, apparatus 820 and/or any suitable wireless communication device, UE, RSU, base station or machine type devices. Solely for illustrative purposes and without limitation, process 1000 is described below in the context of apparatus 810 as a first network node and apparatus 820 as a second network node. Process 1000 may begin at block 1010.

At 1010, process 1000 may involve processor 822 of apparatus 820 receiving, via communication device 825, a first packet with a full header from apparatus 810. Process 1000 may proceed from 1010 to 1020.

At 1020, process 1000 may involve processor 822 establishing a header compression context for the full header. Process 1000 may proceed from 1020 to 1030.

At 1030, process 1000 may involve processor 822 transmitting, via communication device 825, a feedback associated with the full header to apparatus 810. Process 1000 may proceed from 1030 to 1040.

At 1040, process 1000 may involve processor 822 receiving, via communication device 825, a second packet with a compressed header from apparatus 810 responsive to the transmitting of the feedback. Process 1000 may proceed from 1040 to 1050.

At 1050, process 1000 may involve processor 822 restoring the compressed header to the full header based on the header compression context.

In some implementations, in receiving the first packet with the full header, process 1000 may involve processor 822 receiving a first context ID and the first packet with the full header.

In some implementations, in transmitting the feedback, process 1000 may involve processor 822 transmitting the feedback with the first context ID.

In some implementations, in establishing the header compression context for the full header, process 1000 may involve processor 822 storing one or more header fields of the full header of the first packet.

In some implementations, in storing the one or more header fields of the full header of the first packet, process 1000 may involve processor 822 storing a plurality of header fields comprising a destination address field, a source address field, a 802.1Q tag field, and a length or type field.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of a first network node, whether to transmit a full-header packet based on whether a context identifier (ID) validity timer is expired or whether there is a match between one or more stored compressed fields and one or more fields of the full-header packet;
    transmitting, by the processor, a first packet with a full header to a second network node responsive to determining to transmit the first packet as the full-header packet based on expiry of the context ID validity timer or the one or more stored compressed fields matching one or more fields of the full-header packet;
    determining, by the processor, whether a header compression context for the full header has been established by the second network node;
    transmitting, by the processor, a second packet with a compressed header to the second network node responsive to determining that the header compression context for the full header has been established by the second network node by receiving a feedback from the second network node; and
    performing, by the processor, one or more operations responsive to determining that the header compression context for the full header has not been established by the second network node by receiving no feedback from the second network node,
    wherein the one or more operations comprising at least one of:
        releasing stored information related to the first context ID; and
        marking the first context ID as non-valid.

2. The method of claim 1, wherein the transmitting of the first packet with the full header to the second network node comprises:
    establishing the header compression context for the full header by storing one or more header fields of the full header of the first packet;
    assigning the first context ID to the header information of the full header of the first packet; and
    transmitting the first packet containing the first context ID and the full header to the second network node.

3. The method of claim 2, wherein the determining that the header compression context for the full header has been established by the second network node comprises receiving, from the second network node, a feedback with the first context ID.

4. The method of claim 2, wherein the transmitting of the second packet with the compressed header to the second network node comprises removing the one or more header fields from the full header to generate the compressed header.

5. The method of claim 4, wherein the removing of the one or more header fields from the full header to generate the compressed header comprises removing a plurality of header fields comprising a destination address field, a source address field, a 802.1Q tag field, and a length or type field.

6. The method of claim 1, further comprising:
    transmitting, by the processor, the second packet or a third packet with the full header to the second network node responsive to determining that the header compression context for the full header has not been established by the second network node.

7. The method of claim 6, wherein the determining that the header compression context for the full header has not been established by the second network node comprises receiving, from the second network node, no feedback or a feedback associated with a different full header.

8. A method, comprising:
    receiving, by a processor of a second network node, a first packet with a full header from a first network node;
    resetting, by the processor, a timer responsive to receiving the first packet with the full header;
    establishing, by the processor, a header compression context for the full header;
    transmitting, by the processor, a feedback associated with the full header to the first network node;
    receiving, by the processor, a second packet with a compressed header from the first network node responsive to the transmitting of the feedback; and
    discarding, by the processor, the compressed header responsive to there being an error associated with the compressed header,
    wherein the error comprises either or both of:
        an invalid context identifier (ID) being received with the second packet, and there being no stored value for a field that is not in the compressed header.

9. The method of claim 8, wherein the receiving of the first packet with the full header comprises receiving a first context ID and the first packet with the full header.

10. The method of claim 9, wherein the transmitting of the feedback comprises transmitting the feedback with the first context ID.

11. The method of claim 8, wherein the establishing of the header compression context for the full header comprises storing one or more header fields of the full header of the first packet.

12. The method of claim 11, wherein the storing of the one or more header fields of the full header of the first packet comprises storing a plurality of header fields comprising a destination address field, a source address field, a 802.1Q tag field, and a length or type field.

13. The method of claim 8, responsive to there being the error associated with the compressed header, further comprising:
creating, by the processor, an error indication packet including the invalid context ID received with the second packet; and
releasing, by the processor, the invalid context ID.

14. An apparatus implementable in a first network node, comprising:
a communication device configured to communicate with at least a second network node;
a processor coupled to the communication device and configured to function as a compressor by performing operations comprising:
determining whether to transmit a full-header packet based on whether a context identifier (ID) validity timer is expired or whether there is a match between one or more stored compressed fields and one or more fields of the full-header packet;
transmitting, via the communication device, a first packet with a full header to the second network node responsive to determining to transmit the first packet as the full-header packet based on expiry of the context ID validity timer or the one or more stored compressed fields matching one or more fields of the full-header packet;
determining whether a header compression context for the full header has been established by the second network node;
transmitting, via the communication device, a second packet with a compressed header to the second network node responsive to determining that the header compression context for the full header has been established by the second network node by receiving a feedback from the second network node; and
performing, by the processor, one or more operations responsive to determining that the header compression context for the full header has not been established by the second network node by receiving no feedback from the second network node,
wherein the one or more operations comprising at least one of:
releasing stored information related to the first context ID; and
marking the first context ID as non-valid.

15. The apparatus of claim 14, wherein, in transmitting the first packet with the full header to the second network node, the processor performs operations comprising:
establishing the header compression context for the full header by storing one or more header fields of the full header of the first packet;
assigning the first context ID to the header information of the full header of the first packet; and
transmitting the first packet containing the first context ID and the full header to the second network node.

16. The apparatus of claim 15, wherein, in determining that the header compression context for the full header has been established by the second network node, the processor receives, from the second network node, a feedback with the first context ID.

17. The apparatus of claim 15, wherein, in transmitting the second packet with the compressed header to the second network node, the processor removes the one or more header fields from the full header to generate the compressed header, and wherein, in removing the one or more header fields from the full header to generate the compressed header, the processor removes a plurality of header fields comprising a destination address field, a source address field, a 802.1Q tag field, and a length or type field.

18. The apparatus of claim 14, wherein, in determining that the header compression context for the full header has not been established by the second network node, the processor receives, from the second network node, no feedback or a feedback associated with a different full header.

19. The apparatus of claim 14, wherein the processor is further configured to function as a decompressor by performing operations comprising:
receiving, via the communication device, a third packet with a second full header from the second network node;
establishing a second header compression context for the second full header;
transmitting, via the communication device, a feedback associated with the second full header to the second network node;
receiving, via the communication device, a fourth packet with a second compressed header from the second network node responsive to the transmitting of the feedback; and
restoring the second compressed header to the second full header based on the second header compression context,
wherein, in receiving the third packet with the second full header, the processor receives the third packet with a second context identifier (ID) and the second full header, and
wherein, in establishing the second header compression context for the second full header, the processor stores one or more header fields of the second full header of the second packet.

20. The apparatus of claim 19, wherein, in transmitting the feedback, the processor transmits the feedback with the second context ID, and wherein, in storing the one or more header fields of the second full header of the second packet, the processor stores a plurality of header fields comprising a destination address field, a source address field, a 802.1Q tag field, and a length or type field.

* * * * *